(12) United States Patent
Glahn et al.

(10) Patent No.: US 8,105,021 B2
(45) Date of Patent: Jan. 31, 2012

(54) GAS TURBINE ENGINE SYSTEMS INVOLVING HYDROSTATIC FACE SEALS WITH INTEGRATED BACK-UP SEALS

(75) Inventors: Jorn A. Glahn, Manchester, CT (US); Peter M. Munsell, Branby, CT (US)

(73) Assignee: United Technologies Corp., Hartford, CT (US)

( * ) Notice: Subject to any disclaimer, the term of this patent is extended or adjusted under 35 U.S.C. 154(b) by 1079 days.

(21) Appl. No.: 11/841,124

(22) Filed: Aug. 20, 2007

(65) Prior Publication Data

US 2009/0051119 A1 Feb. 26, 2009

(51) Int. Cl.
*F01D 11/02* (2006.01)

(52) U.S. Cl. ............ 415/168.2; 415/171.1; 415/174.4; 415/174.5

(58) Field of Classification Search .......... 415/168.2, 415/168.4, 171.1, 173.7, 174.2, 174.3, 174.4, 415/174.5
See application file for complete search history.

(56) References Cited

U.S. PATENT DOCUMENTS

| | | | |
|---|---|---|---|
| 2,545,916 A | 3/1951 | Clark | |
| 3,501,245 A * | 3/1970 | Ivanko | 184/6.11 |
| 4,103,899 A | 8/1978 | Turner | |
| 4,406,460 A * | 9/1983 | Slayton | 277/401 |
| 4,477,088 A * | 10/1984 | Picard | 277/379 |
| 4,687,346 A | 8/1987 | Suciu | |
| 4,916,892 A | 4/1990 | Pope | |
| 5,137,284 A | 8/1992 | Holder | |
| 5,174,584 A | 12/1992 | Lahrman | |
| 5,180,173 A | 1/1993 | Kimura | |
| 5,284,347 A | 2/1994 | Pope | |
| 6,145,840 A | 11/2000 | Pope | |
| 6,311,983 B1 * | 11/2001 | Burcham | 277/370 |
| 6,341,782 B1 | 1/2002 | Etsion | |
| 6,676,369 B2 | 1/2004 | Brauer | |
| 6,758,477 B2 | 7/2004 | Brauer et al. | |
| 7,175,388 B2 * | 2/2007 | Labbe et al. | 415/174.5 |
| 2004/0207158 A1 | 10/2004 | Agrawal et al. | |
| 2007/0007730 A1 | 1/2007 | Garrison et al. | |
| 2007/0085278 A1 | 4/2007 | Davis et al. | |
| 2007/0149031 A1 | 6/2007 | Martin et al. | |

(Continued)

FOREIGN PATENT DOCUMENTS

DE 524515 C 5/1931

(Continued)

OTHER PUBLICATIONS

The extended European Search Report of counterpart foreign application No. EP 08252690 filed Aug. 18, 2008.

(Continued)

*Primary Examiner* — Nathaniel Wiehe
(74) *Attorney, Agent, or Firm* — Kinney & Lange, P.A.

(57) ABSTRACT

Gas turbine engine systems involving hydrostatic face seals with integrated back-up seals are provided. In this regard, a representative seal assembly for a gas turbine engine includes: a stator assembly and a rotor assembly configured to operatively engage each other to form a first seal and a second seal; the first seal being provided by a hydrostatic seal having a seal face and a seal runner; and the second seal being provided by a back-up seal such that responsive to a failure of the first seal, the back-up seal maintains at least a portion of a pressure differential established by the first seal prior to the failure.

14 Claims, 3 Drawing Sheets

U.S. PATENT DOCUMENTS

2008/0018054 A1    1/2008    Herron et al.

FOREIGN PATENT DOCUMENTS

| | | |
|---|---|---|
| DE | 102007027364 A1 | 12/2007 |
| EP | 0523899 A1 | 1/1993 |
| EP | 1348898 A1 | 10/2003 |
| EP | 1380778 A1 | 1/2004 |
| EP | 1780450 A1 | 5/2007 |
| EP | 1798455 A1 | 6/2007 |
| EP | 1852573 A2 | 11/2007 |
| FR | 1366961 A | 7/1964 |
| GB | 920782 A | 3/1963 |
| GB | 1174207 A | 12/1969 |

OTHER PUBLICATIONS

The extended European Search Report of counterpart foreign application No. EP 08252724 filed Aug. 18, 2008.

* cited by examiner

GAS TURBINE ENGINE SYSTEMS INVOLVING HYDROSTATIC FACE SEALS WITH INTEGRATED BACK-UP SEALS

BACKGROUND

1. Technical Field

The disclosure generally relates to gas turbine engines.

2. Description of the Related Art

A gas turbine engine typically maintains pressure differentials between various components during operation. These pressure differentials are commonly maintained by various configurations of seals. In this regard, labyrinth seals oftentimes are used in gas turbine engines. As is known, labyrinth seals tend to deteriorate over time. By way of example, a labyrinth seal can deteriorate due to rub interactions from thermal and mechanical growths, assembly tolerances, engine loads and maneuver deflections. Unfortunately, such deterioration can cause increased flow consumption resulting in increased parasitic losses and thermodynamic cycle loss.

SUMMARY

Gas turbine engine systems involving hydrostatic face seals with integrated back-up seals are provided. In this regard, an exemplary embodiment of a seal assembly for a gas turbine engine comprises: a stator assembly and a rotor assembly configured to operatively engage each other to form a first seal and a second seal; the first seal being provided by a hydrostatic seal having a seal face and a seal runner; and the second seal being provided by a back-up seal such that responsive to a failure of the first seal, the back-up seal maintains at least a portion of a pressure differential established by the first seal prior to the failure.

An exemplary embodiment of a turbine assembly for a gas turbine engine comprises: a turbine having a hydrostatic seal and a back-up seal; the hydrostatic seal having a carrier, a seal face and a seal runner, the carrier being operative to position the seal face relative to the seal runner; the back-up seal having a first seal-forming component and a second seal-forming component, one of first seal-forming component and a second seal-forming component being mounted to the carrier, the back-up seal being operative such that responsive to a failure of the hydrostatic seal, the back-up seal maintains at least a portion of a pressure differential established by the hydrostatic seal prior to the failure.

An exemplary embodiment of a gas turbine engine comprises: a compressor; a shaft interconnected with the compressor; and a turbine operative to drive the shaft, the turbine having a hydrostatic seal and an integrated back-up seal; wherein, in a normal mode of operation of the hydrostatic seal, interaction of the seal face and the seal runner maintains a pressure differential within the gas turbine engine and, in a failure mode of operation of the hydrostatic seal, the back-up seal maintains at least a portion of the pressure differential within the gas turbine engine.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems involving hydrostatic face seals with integrated back-up seals are provided, several exemplary embodiments of which will be described in detail. In this regard, hydrostatic face seals can be used at various locations of a gas turbine engine, such as in association with a low-pressure turbine. Notably, a hydrostatic seal is a seal that uses balanced opening and closing forces to maintain a desired separation between a seal face and a corresponding seal runner. Unanticipated pressure fluctuations and/or vibrations could cause undesired contact between the seal face and the corresponding seal runner that can cause damage to the seal, e.g., carbon fracture. To mitigate the potential consequence of a damaged hydrostatic face seal, a back-up seal can be provided that is integrated with one or more components forming the hydrostatic seal.

Figure 1:
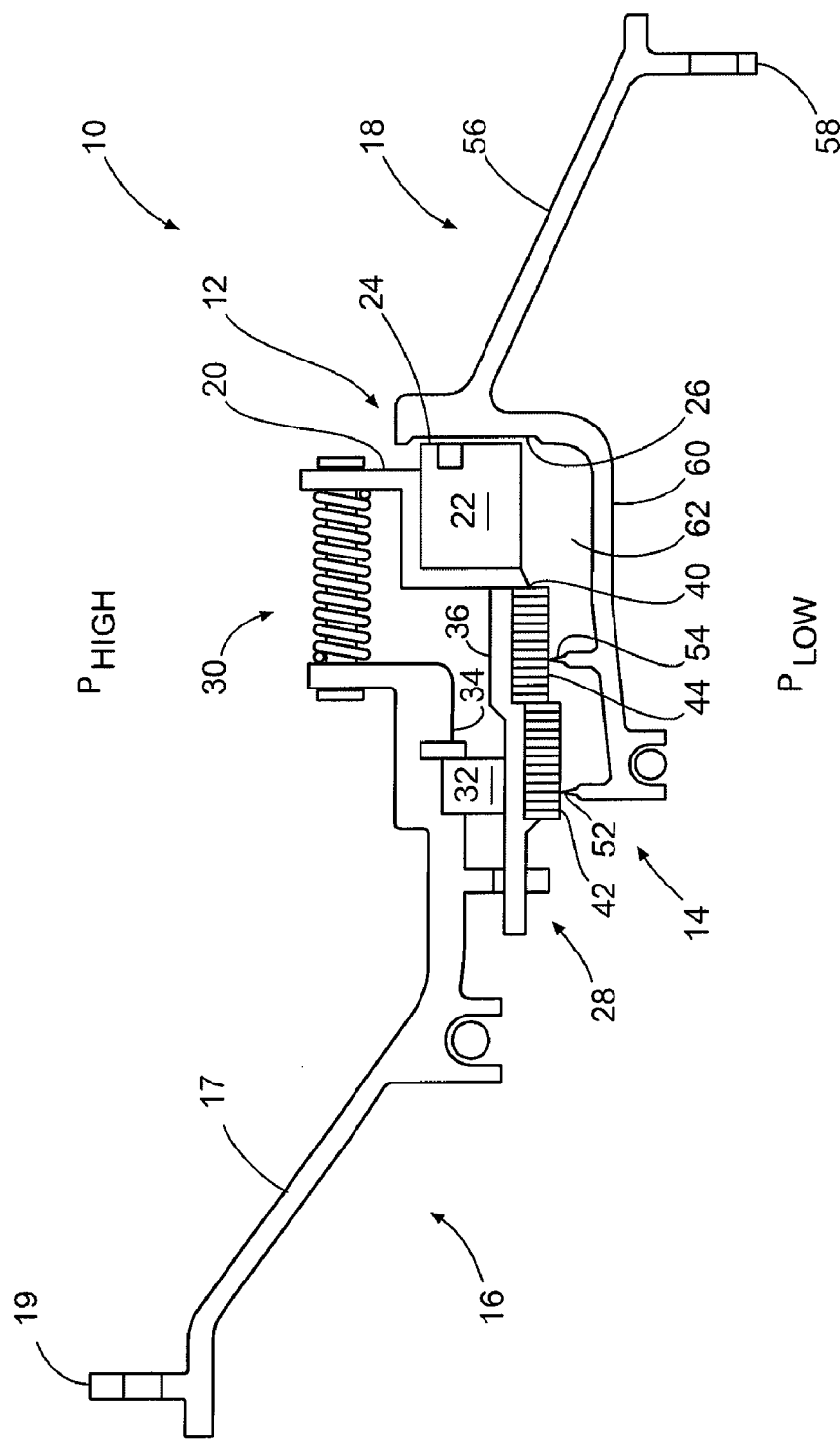
FIG. 1 is a schematic diagram depicting an exemplary embodiment of a hydrostatic face seal with integrated back-up seal.

An exemplary embodiment of a hydrostatic face seal with an integrated back-up seal (collectively referred to herein as a "seal assembly") is depicted schematically in FIG. 1. As shown in FIG. 1, seal assembly 10 incorporates a hydrostatic face seal 12 and a back-up seal 14 that are provided by a stationary stator assembly 16 and a rotating rotor assembly 18. In general, the stator assembly incorporates the seal face of the associated hydrostatic face seal, as well as one or more of the primary components of the back-up seal. In contrast, the rotor assembly incorporates the seal runner of the hydrostatic face seal and others of the primary components of the back-up seal. Notably, when the back-up seal is a labyrinth seal, the stator assembly carries either the honeycomb lands or the knife edges, whereas the rotor carries the corresponding feature of the seal. In the embodiment of FIG. 1, the stator assembly incorporates the honeycomb lands and the rotor assembly incorporates the knife edges as will be described in detail.

With respect to the stator assembly, stator assembly 16 includes an arm 17 that extends from a mounting bracket 19. Mounting bracket 19 facilitates attachment, removal and/or position adjustment of the stator assembly. Notably, other embodiments may not incorporate mounting brackets for ease of installation and/or removal.

Stator assembly 16 incorporates a carrier 20 that carries face seal 22, which is annular in shape. Face seal 22 includes a seal face 24, which is one of the seal-forming surfaces of the hydrostatic seal. Carrier 20 is axially translatable so that seal face 24 can move, with the carrier, away from or toward (e.g., into contact with) a seal runner 26 (which is the other of the seal-forming components of the hydrostatic seal) of rotor assembly 18. In this embodiment, an anti-rotation lock 28 is provided to prevent circumferential displacement and to assist in aligning the seal carrier to facilitate axial translation.

A biasing member 30, which is provided as a spring in this embodiment, biases the seal face against the seal runner until overcome by gas pressure. In this regard, the biasing force of the biasing member can be selected to maintain a desired pressure differential between a high-pressure side ($P_{HIGH}$) and a low-pressure side ($P_{LOW}$) of the seal. Multiple biasing members may be spaced about the stator and carrier. Notably, a piston ring 32 is captured between opposing surfaces 34, 36 of the stator assembly and carrier, respectively, to control gas leakage between the arm of the stator assembly and the carrier.

Surface 40 of the carrier mounts lands 42, 44 of the labyrinth-type back-up seal 14. The lands may be comprised of an abradable structure such as honeycomb. Corresponding knife edges 52, 54 of the labyrinth-type back-up seal are carried by the rotor assembly.

With respect to the rotor assembly, rotor assembly 18 supports the seal runner 26, which is annular in shape. Specifically, the rotor assembly includes an arm 56 that extends from a mounting bracket 58. Mounting bracket 58 facilitates attachment, removal and/or position adjustment of the rotor assembly.

The knife edges 52, 54 of the labyrinth-type back-up seal are supported by an annular extension 60 that extends from the arm of the rotor assembly. Thus, extension 60 assists in defining an intermediate-pressure cavity 62 that is located between the hydrostatic seal and the back-up seal. Note also that extension 60 can assist in preventing debris (e.g., debris that may by attributable to unintended damage of the hydrostatic seal) from passing beyond the back-up seal.

In a normal mode of operation (i.e., when the hydrostatic face seal is properly seated), the desired pressure differential is maintained, at least primarily, across the hydrostatic face seal 12. However, in a failure mode of operation (i.e., when the hydrostatic face seal fails due to unintended circumstances), a corresponding pressure differential is maintained, at least primarily, across the back-up seal 14. Thus, in the failure mode of operation, intermediate-pressure cavity 62 typically exhibits $P_{HIGH}$.

Figure 2:
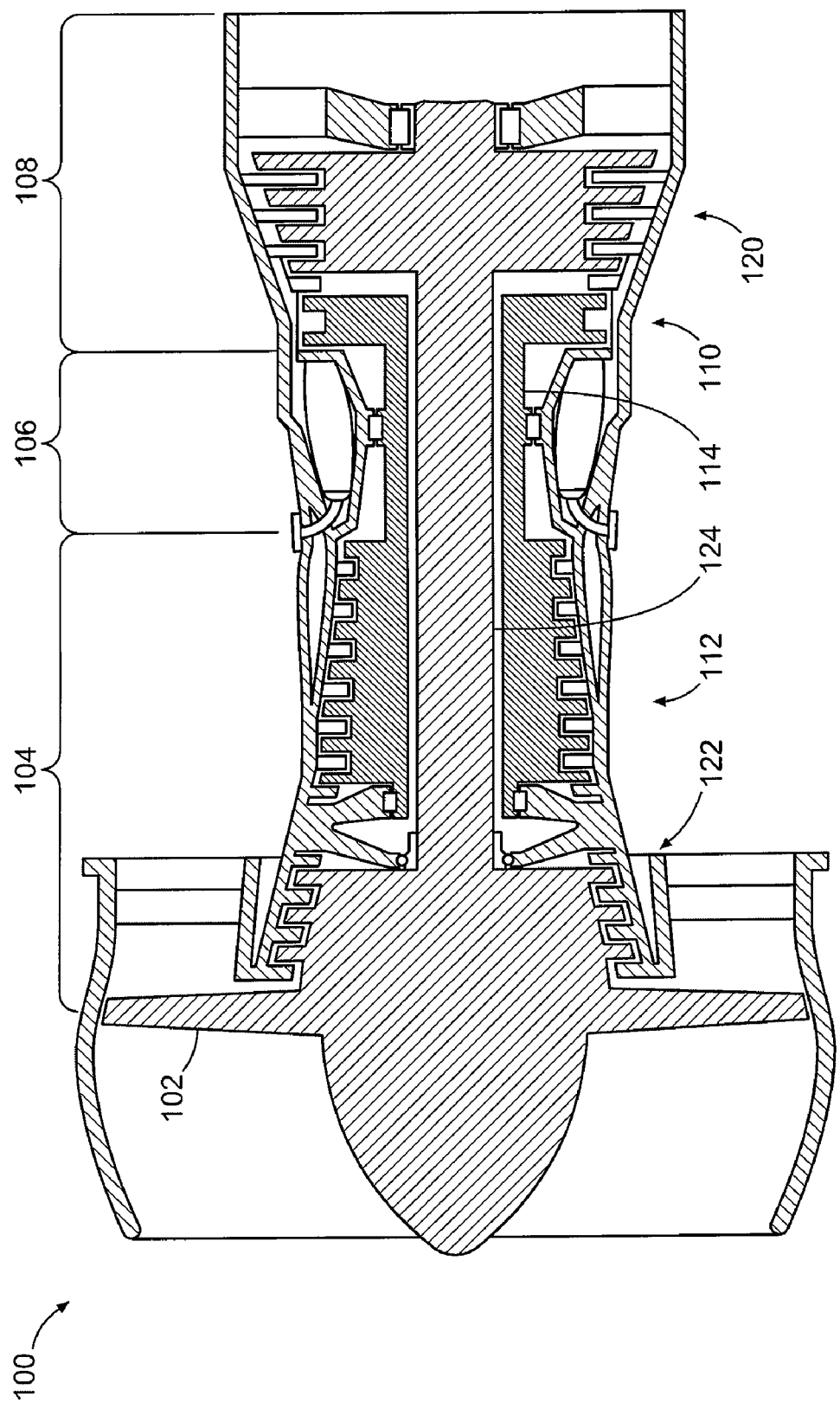
FIG. 2 is a schematic diagram depicting an exemplary embodiment of a gas turbine engine.

FIG. 2 is a schematic diagram depicting an exemplary embodiment of a gas turbine engine, in which an embodiment of a hydrostatic face seal with integrated back-up seal can be used. As shown in FIG. 2, engine 100 is configured as a turbofan that incorporates a fan 102, a compressor section 104, a combustion section 106 and a turbine section 108. Although the embodiment of FIG. 2 is configured as a turbofan, there is no intention to limit the concepts described herein to use with turbofans, as various other configurations of gas turbine engines can be used.

Engine 100 is a dual spool engine that includes a high-pressure turbine 110 interconnected with a high-pressure compressor 112 via a shaft 114, and a low-pressure turbine 120 interconnected with a low-pressure compressor 122 via a shaft 124. It should also be noted that although various embodiments are described as incorporating hydrostatic face seals in low-pressure turbines, such seals are not limited to use with low-pressure turbines.

Figure 3:
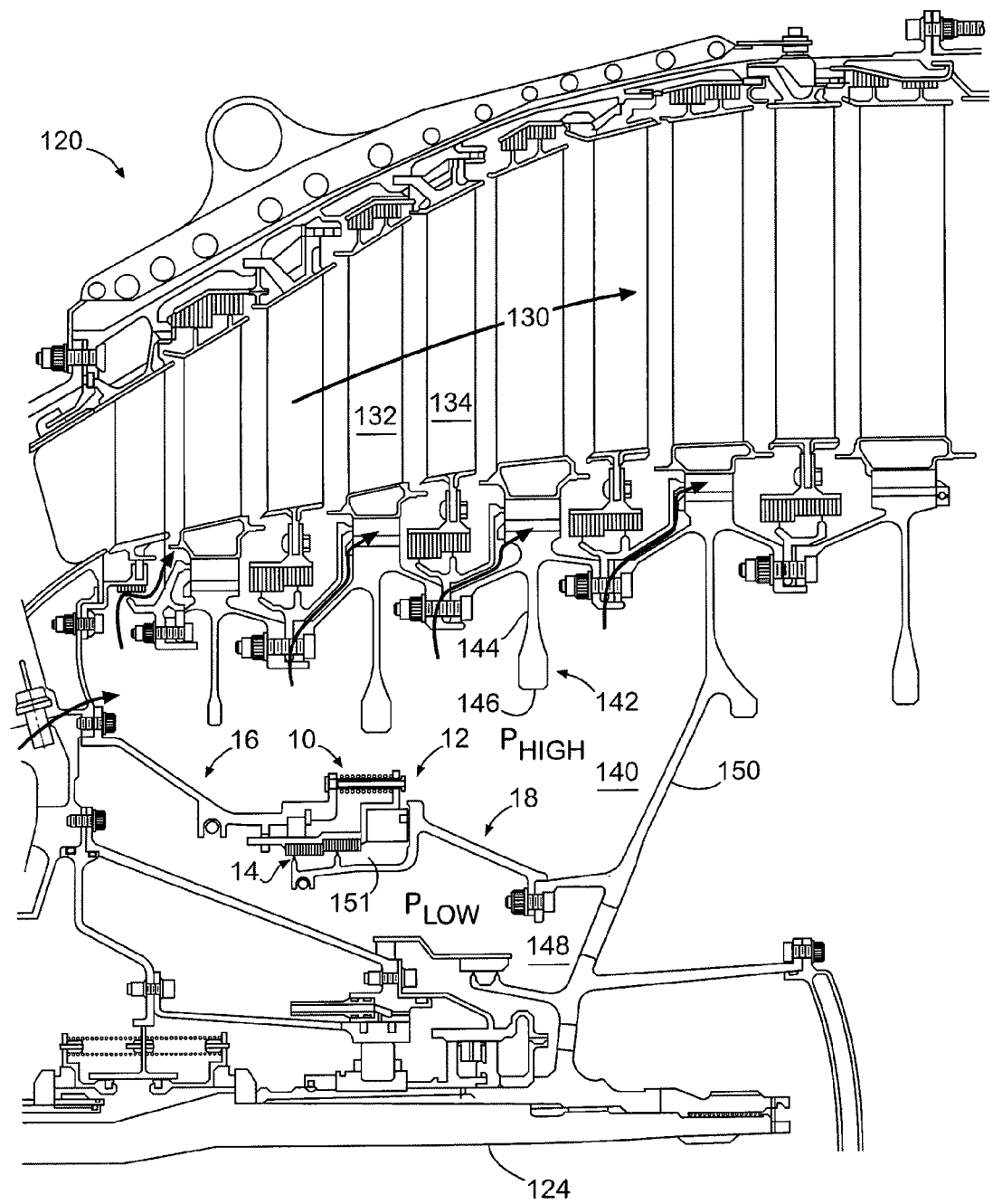
FIG. 3 is a schematic diagram depicting a portion of the low-pressure turbine of FIG. 2, showing detail of the embodiment of the hydrostatic face seal with integrated back-up seal of FIG. 1 installed therein.

As shown in FIG. 3, low-pressure turbine 120 defines a primary gas flow path 130 along which multiple rotating blades (e.g., blade 132) and stationary vanes (e.g., vane 134) are located. In this embodiment, the blades are mounted to turbine disks, the respective webs and bores of which extend into a high-pressure cavity 140. For instance, disk 142 includes a web 144 and a bore 146, each of which extends into cavity 140.

A relatively lower-pressure cavity 148 is oriented between high-pressure cavity 140 and turbine hub 150, with a seal assembly 10 (described in detail before with respect to FIG. 1) being provided to maintain a pressure differential between the high-pressure cavity and the lower-pressure cavity. Seal assembly 10 incorporates a hydrostatic face seal 12 and a back-up seal 14 that are provided by a stator assembly 16 and a rotor assembly 18. Notably, the stator assembly is mounted to a non-rotating structure of the turbine, whereas the rotor assembly is mounted to a rotating structure. In the implementation of FIG. 3, the rotor assembly is mounted to the low-pressure turbine hub 150. Additionally, an intermediate-pressure cavity 151 is defined between hydrostatic face seal 12 and back-up seal 14.

It should be noted that seal assembly 10 is provided as a removable assembly, the location of which can be adjusted axially and radially. As such, thrust balance trimming of engine 100 can be at least partially accommodated by altering the position of the seal assembly to adjust the volume of cavities 140 and 148

In operation, the seal face intermittently contacts the seal runner. By way of example, contact between the seal face and the seal runner can occur during sub-idle conditions and/or during transient conditions. That is, contact between the seal face and the seal runner is maintained until gas pressure in the high-pressure cavity is adequate to overcome the biasing force, thereby separating the seal face from the seal runner. During normal operating conditions, however, the seal face and the seal runner should not contact each other.

Since the embodiments described herein are configured as lift-off seals (i.e., at least intermittent contact is expected), materials forming the surfaces that will contact each other are selected, at least in part, for their durability. In this regard, a material containing carbon can be used as a seal face material. It should be noted, however, that carbon can fracture or otherwise be damaged due to unintended contact (e.g., excessively forceful contact) between the seal face and the seal runner as may be caused by severe pressure fluctuations and/or vibrations, for example. It should also be noted that carbon may be susceptible to deterioration at higher temperatures. Therefore, carbon should be used in locations where predicted temperatures are not excessive such as in the low-pressure turbine. By way of example, use of such a material may not be appropriate, in some embodiments, in a high-pressure turbine.

In a normal mode of operation (i.e., when the hydrostatic seal is properly functioning), a nominal pressure differential exists between intermediate-pressure cavity 151 and lower-pressure cavity 148. That is, the pressure differential between the high-pressure cavity and the lower-pressure cavity is maintained, at least primarily, across the hydrostatic face seal 12. However, in a failure mode of operation (i.e., the hydrostatic seal fails), the pressure of the high-pressure cavity 140 is depleted to a level lower than during the normal mode of operation but higher than that of intermediate cavity 151 during normal operation. The increase in pressure differential across the back-up seal 14 is due to the increased flow rate imposed on the back-up seal during failure of the primary seal. Thus, in the failure mode of operation, pressure in intermediate cavity 151 increases and a corresponding pressure differential is maintained, at least primarily, across the back-up seal 14.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, although the embodiments described herein are configured as lift-off seals, other types of seals can be used. All such modifications and variations are intended to be included herein within the scope of this disclosure and protected by the accompanying claims.

The invention claimed is:

1. A seal assembly for a gas turbine engine comprising:
a stator assembly and a rotor assembly configured to operatively engage each other to form a first seal and a labyrinth seal;
the stator assembly including a carrier and an arm which is disposed opposite the carrier, together the arm and the carrier capture a piston ring therebetween;
the first seal being provided by a hydrostatic seal having a seal face and a seal runner, the carrier mounting the seal face on a first face of the carrier, the carrier mounting a land of the labyrinth seal on a second face thereof; and
the rotor assembly including an extension arm, together the extension arm and the carrier form an intermediate cavity and the extension arm supports a knife edge of the labyrinth seal to interface with the land to dispose the labyrinth seal between the intermediate cavity and a lower pressure cavity;
wherein the labyrinth seal acts as a back-up seal responsive to a failure of the first seal, the back-up seal maintains at least a portion of a pressure differential established by the first seal prior to the failure.

2. The assembly of claim 1, wherein the carrier is operative to move the seal face axially.

3. The assembly of claim 1, wherein each of the stator assembly and the rotor assembly has a mounting bracket operative to removably mount the stator assembly and the rotor assembly, respectively, within the gas turbine engine.

4. The assembly of claim 1, wherein the hydrostatic seal is a lift-off seal, with the seal face being biased to a contact position in which the seal face contacts the seal runner.

5. The assembly of claim 4, wherein the stator assembly has a biasing member operative to bias the seal face to the contact position.

6. The assembly of claim 4, wherein at least a portion of the seal face configured to contact the seal runner is formed of a material comprising carbon.

7. A turbine assembly for a gas turbine engine comprising:
a turbine having a stator assembly and a rotor assembly configured to operatively engage each other to form a hydrostatic seal and a labyrinth seal;
the stator assembly including a carrier and an arm which is disposed opposite the carrier, together the arm and the carrier capture a piston ring therebetween;
the hydrostatic seal having a seal face and a seal runner, the carrier mounting the seal face on a first face of the carrier and the carrier being operative to position the seal face relative to the seal runner, the carrier mounting a land of the labyrinth seal along a second face thereof; and
the rotor assembly including an extension arm, together the extension arm and the carrier form an intermediate cavity and the extension arm supports a knife edge of the labyrinth seal to interface with the land to dispose the labyrinth seal between the intermediate cavity and a lower pressure cavity;
wherein the labyrinth seal acts as a back-up seal that is responsive to a failure of the hydrostatic seal to maintain at least a portion of a pressure differential established by the hydrostatic seal prior to the failure.

8. The assembly of claim 7, wherein at least a portion of the seal face configured to contact the seal runner is formed of a material comprising carbon.

9. The assembly of claim 7, wherein the turbine is a low-pressure turbine.

10. The assembly of claim 7, wherein the carrier, the stator assembly is removably mountable within the turbine.

11. The assembly of claim 7, wherein the rotor assembly is removably mountable within the turbine.

12. The assembly of claim 7, wherein the hydrostatic seal is a lift-off seal, with the seal face being biased to a contact position in which the seal face contacts the seal runner.

13. A gas turbine engine comprising:
a compressor;
a shaft interconnected with the compressor;
a turbine operative to drive the shaft, the turbine having a stator assembly and a rotor assembly configured to operatively engage each other to form a hydrostatic seal and a labyrinth seal;
the stator assembly including a carrier and an arm which is disposed opposite the carrier, together the arm and the carrier capture a piston ring therebetween;
the hydrostatic seal having a seal face and a seal runner, the carrier mounting the seal face on a first face of the carrier and the carrier being operative to position the seal face relative to the seal runner, the carrier mounting a land of the labyrinth seal along a second face thereof; and
the rotor assembly including an extension arm, together the extension arm and the carrier form an intermediate cavity and the extension arm supports a knife edge of the labyrinth seal to interface with the land to dispose the labyrinth seal between the intermediate cavity and a lower pressure cavity;
wherein, in a normal mode of operation of the hydrostatic seal, interaction of the seal face and the seal runner maintains a pressure differential within the gas turbine engine and, in a failure mode of operation of the hydrostatic seal, the back-up seal maintains at least a portion of the pressure differential within the gas turbine engine.

14. The engine of claim 13, wherein at least a portion of the seal face configured to contact the seal runner is formed of a material comprising carbon.